(12) United States Patent
Thomas et al.

(10) Patent No.: US 12,387,272 B1
(45) Date of Patent: Aug. 12, 2025

(54) SYSTEMS AND METHODS FOR CONTINUOUSLY MONITORING ITEMS

(71) Applicant: United Services Automobile Association (USAA), San Antonio, TX (US)

(72) Inventors: Anto Chirayil Thomas, Coppell, TX (US); Subhalakshmi Selvam, Allen, TX (US); Charlotte Thomas Creech, San Antonio, TX (US); Nathan Lee Post, Rockport, TX (US); Mathew Cyriac Kottoor, San Antonio, TX (US); Nina Cooper, San Antonio, TX (US); Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 102 days.

(21) Appl. No.: 18/175,046

(22) Filed: Feb. 27, 2023

Related U.S. Application Data

(60) Provisional application No. 63/314,739, filed on Feb. 28, 2022.

(51) Int. Cl.
*G06Q 40/08* (2012.01)
*G08B 13/24* (2006.01)

(52) U.S. Cl.
CPC ......... *G06Q 40/08* (2013.01); *G08B 13/2448* (2013.01)

(58) Field of Classification Search
CPC .................................................... G06Q 40/08
See application file for complete search history.

(56) References Cited

U.S. PATENT DOCUMENTS

| 11,954,735 | B1* | 4/2024 | Chmielweski | ......... G06Q 40/08 |
| 2002/0104013 | A1* | 8/2002 | Ghazarian | ............... G06F 11/30 |
| 2021/0019589 | A1* | 1/2021 | Shakked | ............... G06K 19/077 |

FOREIGN PATENT DOCUMENTS

| CA | 2976772 | * | 7/2016 | ............. G06B 13/24 |
| CA | 3056684 | * | 9/2018 | |

OTHER PUBLICATIONS

Papadakis, et al., in An IOT-Based Participatory Antitheft System for Public Safety Enhancement in Smart Cities, from Smart Cities, 2021 (Year: 2021).*

* cited by examiner

*Primary Examiner* — Mike Anderson
*Assistant Examiner* — Brandon M Duck
(74) *Attorney, Agent, or Firm* — Fletcher Yoder, P.C.

(57) ABSTRACT

A system may include one or more detectors configured to generate detector data based on signals received from one or more tags integrated in or disposed on one or more items. The system may include a processor configured to: receive the detector data; determine a first set of identification information corresponding to a first item of the one or more items based on the detector data; receive a list of tagged items for a first location, and the list of tagged items comprises a second set of identification information corresponding to the one or more items; identify a theft incident for the first item based on a comparison of the first and second sets of identification information; automatically send a notification relating to the theft incident to one or more devices; and determine one or more insurance policy decisions for the first item based on the theft incident.

15 Claims, 3 Drawing Sheets

SYSTEMS AND METHODS FOR CONTINUOUSLY MONITORING ITEMS

CROSS-REFERENCE TO RELATED APPLICATION

This application claims priority to and the benefit of U.S. Provisional Patent Application No. 63/314,739, filed Feb. 28, 2022, entitled "SYSTEMS AND METHODS FOR CONTINUOUSLY MONITORING ITEMS," the disclosure of which is incorporated by reference in its entirety for all purposes.

BACKGROUND

The present disclosure relates generally to systems and methods for continuously monitoring and identifying items. More specifically, the present disclosure generally relates to detecting and monitoring items to identify theft incidents.

Theft incidents oftentimes result in unexpected expenses to insurance companies and their members. Moreover, in many cases, insurance companies may have difficulty to confirm whether a particular item is stolen (e.g., the item may instead be left in a forgotten place). As such, the inability to track items may lead to unnecessary insurance-related costs.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system may include one or more detectors configured to generate detector data based on signals received from one or more tags integrated in or disposed on one or more items. The system may also include a theft monitoring system comprising a processor configured to: receive the detector data from the one or more detectors; determine a first set of identification information corresponding to a first item of the one or more items based at least in part on the detector data; receive a list of tagged items for a first location, wherein the list of tagged items comprises a second set of identification information corresponding to the one or more items; identify a theft incident for the first item on the list of tagged items based on a comparison of the first set of identification information and the second set of identification information; automatically send a notification relating to the theft incident to one or more devices; and determine one or more insurance policy decisions for the first item based on the theft incident.

In addition, in certain embodiments, a method may include receiving detector data from one or more detectors configured to receive signals from one or more tags integrated in or disposed on one or more items. The method may also include determining a first set of identification information corresponding to a first item of the one or more items based at least in part on the detector data. The method may further include receiving a list of tagged items for a first location. The list of tagged items includes a second set of identification information corresponding to the one or more items. In addition, the method may include identifying a theft incident for the first item on the list of tagged items based on a comparison of the first set of identification information and the second set of identification information. The method may also include automatically sending notification relating to the theft incident to one or more devices. The method may further include determining one or more insurance policy decisions for the first item based on the theft incident.

In addition, in certain embodiments, a method may include receiving motion data of an item from a motion sensor. The method may also include determining a recommendation of an operating parameter for a tag associated with the item based on the motion data. The method may further include sending an instruction to cause the tag to send a detection signal using the operating parameter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

Systems and methods described herein enable theft incidents to be detected and notifications of the theft incidents to be automatically sent to certain devices. In addition, in certain embodiments, protective actions may be activated in response to sending and/or receiving the notifications. In addition, in certain embodiments, an insurance company may determine a policy decision (e.g., claim coverage) based on the notifications.

In certain embodiments, theft incidents may be detected by monitoring tags integrated in or disposed on a tangible item. Each tag may be integrated in or disposed on a particular item inside an area (e.g., a household, an office, a storage place, a laboratory, and so forth). In certain embodiments, the items may be furniture (e.g., bed, desk, sofa, and so forth), appliances (e.g., kitchen refrigerators, kitchen ovens, washing machines, dryers, and so forth), devices (e.g., televisions (TVs), computers, Internet routers, safes, and so forth), equipment (e.g., lab equipment, tools, and so forth), instruments (e.g., artistic instruments, scientific instruments, and so forth), entertainment media (e.g., books, CDs, DVDs, and so forth), clothes, accessories (e.g., jewelry), and other tangible items (e.g., a piece of paper, a portion of ceiling, and so forth). Each tag may include one or more sensors (e.g., motion sensors, RFID sensors, location sensors, sound sensors, image sensors, temperature sensors, intelligent electronic devices, beacons, and so forth). In certain embodiments, the tags may be powered by a battery (e.g., rechargeable battery either standing alone or connected to a power system, button cells, and so forth) or by a power supply (e.g., power system, solar panel power system, and so forth), or any combination thereof (e.g., converting to other power supply methods when there is an outage of one power supply). In other embodiments, the tags may not be powered (e.g., may include passive signal receivers). As described in greater detail herein, it may be determined whether a particular tagged item has been moved out of an area by monitoring the tag on the particular tagged item using detectors.

In certain embodiments, detectors (e.g., motion detectors, RFID readers, location detectors, sound detectors, image detectors, intelligent electronic devices, and so forth) may be installed or disposed in an area and powered by a power system or by a battery. In addition, in certain embodiments, detectors may be installed in or disposed on mobile devices (e.g. smart phones, computers, tablets, wearable devices, and so forth). In addition, in certain embodiments, detectors may be installed or disposed in vehicles. In addition, in certain embodiments, detectors may be installed or disposed in an area standing alone, or on items inside the area. In addition, in certain embodiments, detectors may detect an item by detecting and identifying a tag associated with the item, and automatically generate and send detector data to a theft monitoring system.

In certain embodiments, a theft monitoring system may receive a list of tagged items in an area from databases or other data resources. In addition, in certain embodiments, the theft monitoring system may receive detector data from detectors. In certain embodiments, the theft monitoring system may generate an item area map indicating items and their locations in the area based on data received from detectors and/or data received from other sources. In certain embodiments, the theft monitoring system may receive GPS (global positioning system) data or location data from other location tracking devices, and generate an item area map indicating items and their corresponding locations in the area. In certain embodiments, the theft monitoring system may use network traffic data received from network devices (e.g., routers) to generate an item area map (i.e., item network identification associated with virtual network address) for items using the network connections in the area. For example, in certain embodiments, network traffic data packets received by the theft monitoring system may include a MAC address, such that a first portion of the MAC address may indicate that a particular vendor (e.g., manufacturer) is associated with the device and a second portion of the MAC address may indicate that the device corresponds to a particular type of device (e.g., tablet). As such, the MAC address may indicate to the theft monitoring system the particular device being detected. In certain embodiments, the theft monitoring system may compare the list of tagged items in the area with the item area map for the area to determine whether a theft incident has occurred. For example, if the items on the item area map deviate from the items on the list, a theft incident may have occurred.

In certain embodiments, the theft monitoring system may use network data received from network service providers such as internet service providers (e.g., Xfinity, AT&T, and so forth), streaming service providers (e.g., Netflix, Hulu, and so forth), or streaming device manufacturers (e.g., smart devices manufacturers), to monitor an item in the network. For instance, a cable company may identify a particular cable modem online in the network, or a streaming service provider may identify a particular smart TV associated with an account in the network. In addition, a streaming device manufacturer may also identify a particular product in the network. For instance, when a stolen smart TV is activated and connected to the Internet, the TV manufacturer may identify it by recognizing its serial number.

In certain embodiments, the theft monitoring system may use detector data received from detectors outside of an area, such as detectors in other areas (e.g., another room, another building, and so forth), detectors in mobile devices outside of the area (e.g., a smart phone or smart watch travelling with the user), detectors in vehicles outside of the area to confirm whether an item missing in that area is stolen, and so forth. In certain embodiments, the theft monitoring system may compare the information of the missing item in the area with detector data received from the detectors outside of the area to determine whether the missing item is stolen. For example, if detector data received from a mobile device travelling with a user indicates a missing item within the user's house, a theft incident may not have occurred (i.e., the user may have simply taken the item outside the user's house). In addition, in certain embodiments, the theft monitoring system may confirm the missing item by using item area maps generated using data from other sources (e.g., network devices, network service providers, GPS, and so forth).

In certain embodiments, the theft monitoring system may be coupled to another existing monitoring system of the property, or may be stand alone. In addition, in certain embodiments, the theft monitoring system may be installed on a mobile device. In addition, in certain embodiments, the detectors may be portable such that they may be relocatable with respect to the areas that are being monitored. In certain embodiments, the theft monitoring system may be used to monitor the property for a particular period of time. As such, the theft monitoring system may help both an insurance company and the user, may work on-demand, may be easily coupled to other existing systems, may be relatively portable, and so forth.

In certain embodiments, the theft monitoring system may record a theft incident with its time of occurrence and identification and location information of missing items. In addition, in certain embodiments, an insurance company may determine insurance policy coverage based on the record of the theft incident. In certain embodiments, the theft monitoring system may automatically send a notification of the theft incident to certain devices and/or activate protective actions.

Figure 1:
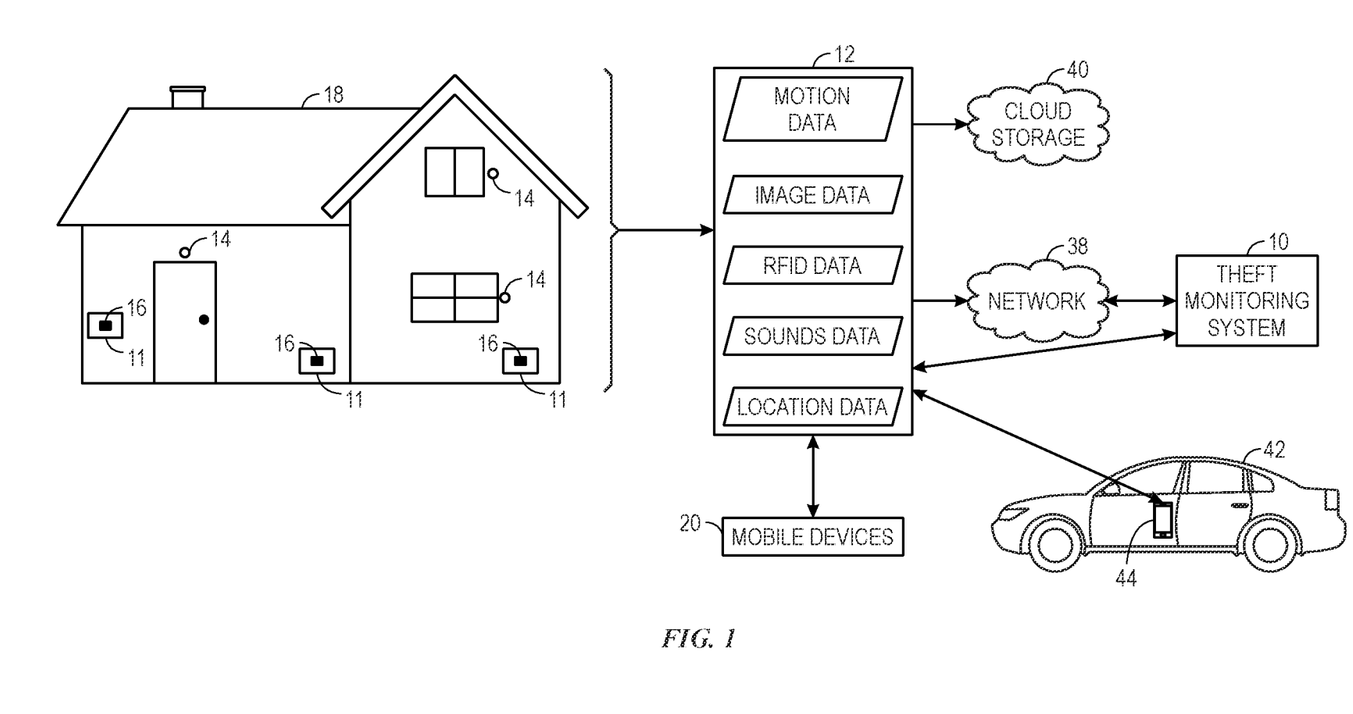
FIG. 1 illustrates a block diagram of a system communicatively coupled to a number of data sources, in accordance with embodiments described herein.

By way of introduction, FIG. 1 is a block diagram of a system that includes a number of data sources that may be employed by the embodiments described herein. For example, the system may include a theft monitoring system 10 communicatively coupled to a variety of data sources that may assist the theft monitoring system 10 to monitor theft incidents occurring for an area. Data from the variety of data sources may include insurance data (e.g., existing insurance coverage and premiums) for a user, a list of tagged items 11 in the area that is determined at the initial setup of tags for the area (or updated later), and detector data 12. The tagged items 11 may be any tangible items 11 (e.g., a portion of wall with painting, a piece of paper of a will, and so forth) in the area as described in greater detail herein. Detector data 12 may be gathered from a variety of detectors 14 (e.g., motion detectors, RFID readers, location detectors, sound detectors, image detectors, intelligent electronic devices, and so forth) monitoring one or more tags 16, which in certain embodiments may be removably attached to particular tagged items 11. Each tag 16 may include one or more sensors (e.g., motion sensors, RFID sensors, location sensors, sound sensors, image sensors, temperature sensors, intelligent electronic devices, beacons, and so forth). In certain embodiments, the tags 16 may be integrated in or disposed on particular items 11 located within a property 18. In certain embodiments, the tags 16 may be powered by a battery (e.g., rechargeable battery either standing alone or connected to a power system, button cells, and so forth) or by a power supply (e.g., power system, solar panel power system, and so forth) that is integrated into the tag 16, or any combination thereof (e.g., converting to other power supply methods when there is an outage on one power supply). In other embodiments, the tags 16 may not be powered (e.g. passive signal receivers).

In certain embodiments, the tagged items 11 may be furniture (e.g., bed, desk, sofa, and so forth), appliances (e.g., kitchen refrigerators, kitchen ovens, washing machines, dryers, and so forth), devices (e.g., televisions (TVs), computers, Internet routers, safes, and so forth), equipment (e.g., lab equipment, tools, and so forth), instruments (e.g., artistic instruments, scientific instruments, and so forth), entertainment media (e.g., books, CDs, DVDs, and so forth), clothes, accessories (e.g., jewelry), and other tangible tagged items 11 (e.g., a piece of paper, a portion of ceiling, and so forth). Each tag may include one or more sensors (e.g., motion sensors, RFID sensors, location sensors, sound sensors, image sensors, temperature sensors, intelligent electronic devices, beacons, and so forth).

In certain embodiments, the tags 16 may receive/transmit signals from/to the detectors 14. In certain embodiments, the tags 16 may emit signals comprising identification information of associated tagged items 11 in a predetermined repetition rate (e.g., every 1 hour, every 30 minutes, every 15 minutes, every 5 minutes, and so forth), and the detectors 14 may detect the signals and identify the location of the tags 16. In other embodiments, the detectors 14 may automatically send out a detecting signal and scan the area to detect reflected or scattered detecting signals from the tags 16 (e.g., RADAR, LIDAR, RFID reader, IR depth camera, and so forth). By way of example, a beacon detector located near an exit of the property 18 (e.g., door or window), battery powered or charged by a power system, may detect a signal transmitted from a beacon attached on a tagged item 11 passing through the exit. Upon detecting the signal from the beacon, the beacon detector may automatically send detector data comprising information of the associated tagged item 11, which may be used by the theft monitoring system 10 to determine the identification of the tagged item 11 and identify a theft incident of the tagged item 11.

In certain embodiments, detector data 12 may be transmitted to a database 36, through a network 38, or to cloud storage 40 either directly from the detectors 14 or from mobile devices 20 (e.g., smart phones, laptops, and so forth) communicatively coupled to the detectors 14. In certain embodiments, detector data 12 may include data transmitted from a vehicle 42 and detected by a vehicle system 44.

Figure 2:
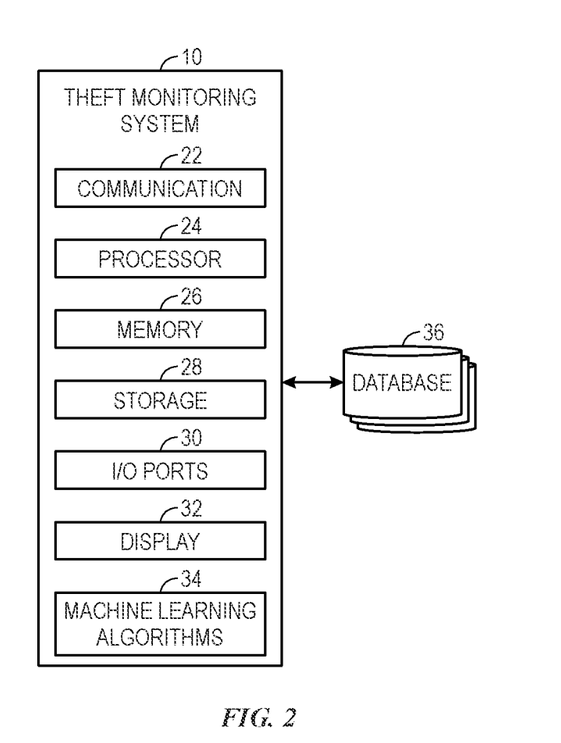
FIG. 2 illustrates a block diagram of a theft monitoring system, in accordance with embodiments described herein.

As described in greater detail herein, the theft monitoring system 10 may collect data from the various data sources (e.g., the data sources depicted in FIG. 1) and perform various types of analysis to identify theft incidents for certain tangible tagged items 11 that are associated with the tags 16. By way of example, FIG. 2 is a block diagram of example components of the theft monitoring system 10. In particular, in certain embodiments, the theft monitoring system 10 may include various types of components that may assist the theft monitoring system 10 in performing the various functions described herein. For example, in certain embodiments, the theft monitoring system 10 may include a communication component 22, a processor 24, memory media 26, storage media 28, input/output (I/O) ports 30, a display 32, machine learning algorithms 34 that may be executed by the processor 24, and so forth.

In certain embodiments, the communication component 22 may be a wireless or wired communication component that may facilitate communication between the theft monitoring system 10 and various devices via a network, the Internet, and so forth. For example, in certain embodiments, the communication component 22 may allow the theft monitoring system 10 to obtain the data from the variety of data sources, such as databases 36 (e.g., insurance database, database for list of tagged items 11 in certain areas), detector data 12 (either directly from detectors 14 or through a mobile device 20 or from a vehicle system 44), cloud storage 40, and so forth. In certain embodiments, the communication component 22 may receive and automatically send notifications to devices located in the property 18 or mobile devices associated with the user. In addition, in certain embodiments, the communication component 22 may use a variety of communication protocols, such as Open Database Connectivity (ODBC), TCP/IP protocol, Distributed Relational Database Architecture (DRDA) protocol, Database Change protocol (DCP), HTTP protocol, other suitable current or future protocols, or combinations thereof.

In certain embodiments, the processor 24 may process instructions for execution by the theft monitoring system 10. The processor 24 may include single-threaded processor(s), multi-threaded processor(s), or both. In certain embodiments, the processor 24 may process instructions stored in the memory media 26. The processor 24 may also include hardware-based processor(s), each including one or more cores. The processor 24 may include general purpose processor(s), special purpose processor(s), or both. The processor 24 may be communicatively coupled to other internal components of the theft monitoring system 10 (such as the communication component 22, the storage media 28, the I/O ports 30, and the display 32).

In certain embodiments, the memory media 26 and the storage media 28 may be any suitable articles of manufacture that can serve as media to store processor-executable code, data, and so forth. These articles of manufacture may represent computer-readable media (e.g., any suitable form of memory or storage) that may store the processor-executable code used by the processor 24 to perform the presently disclosed techniques. As used herein, applications may include any suitable computer software or program that may be installed onto the theft monitoring system 10 and executed by the processor 24. The memory media 26 and the storage media 28 may represent non-transitory computer-readable media (e.g., any suitable form of memory or storage) that may store the processor-executable code used by the processor 24 to perform various techniques described herein. It should be noted that non-transitory merely indicates that the media is tangible, and not a signal.

In certain embodiments, the I/O ports 30 may be interfaces that may couple to other peripheral components such as input devices (e.g., keyboard, mouse, and so forth), the detectors 14, input/output (I/O) modules, and so forth. In certain embodiments, the display 32 may operate as a human machine interface (HMI) to depict visualizations associated with software or executable code being processed by the processor 24. In one embodiment, the display 32 may be a touch display capable of receiving inputs from an operator of the theft monitoring system 10. The display 32 may be any suitable type of display, such as a liquid crystal display (LCD), plasma display, or an organic light emitting diode (OLED) display, for example. Additionally, in one embodiment, the display 32 may be provided in conjunction with a touch-sensitive mechanism (e.g., a touch screen) that may function as part of a control interface for the theft monitoring system 10. It should be noted that the components described above with regard to the theft monitoring system 10 are examples and the theft monitoring system 10 may include additional or fewer components relative to the illustrated embodiment.

Referring back to the FIG. 1, in certain embodiments, the theft monitoring system 10 may be communicatively coupled to a network 38, which may include collections of theft monitoring systems, the Internet, an Intranet system, and so forth. The network 38 may facilitate communication between the theft monitoring system 10 and various other data sources. For example, the network 38 may be communicatively coupled to the detectors 14. In certain embodiments, the detectors 14 correspond to one or more sensors or devices associated with (and, in certain embodiments, directly coupled to) tags 16. Although the detectors 14 are described herein as being communicatively coupled to the theft monitoring system 10 via the network 38, it should also be noted that, in other embodiments, the detectors 14 may be communicatively coupled directly to the theft monitoring system 10.

In certain embodiments, the network 38 may also be communicatively coupled to databases 36, which may store data relating to the user and/or the property 18, such as insurance records, theft incident records, historical detector data, list(s) of tagged items 11 in areas, and other information that may be relevant for determining a theft incident, an insurance policy and/or insurance coverage, and so forth. In certain embodiments, the network 38 may be communicatively coupled to cloud storage 40, which may store data relating to the user and/or the property 18 that may be relevant for determining a theft incident, an insurance policy and/or insurance coverage, and so forth. In addition, in certain embodiments, the network 38 may further be communicatively coupled to mobile devices 20 and/or a vehicle system 44 associated with the vehicle 42.

In certain embodiments, the detectors 14 may monitor each tag 16 associated with particular items 11 located within the property 18. The detectors 14 may detect motion data, location data, RFID data, beacon data, sound data, image data, and so forth. By way of example, in certain embodiments, the detectors 14 may include beacon detectors configured to detect signals from beacons inside the tags 16. In certain embodiments, the detectors 14 may include RFID readers detecting RFID tags 16. In certain embodiments, the theft monitoring system 10 may receive lists of tagged items 11 in areas from the mobile devices 20, the storage media 28, the database 36, the network 38, the cloud storage 40, or other data sources. In certain embodiments, the theft monitoring system 10 may use the communication component 22 to receive detector data 12 generated by the detectors 14, and may store the detector data 12 in the database 36 and/or the cloud storage 40.

In certain embodiments, the theft monitoring system 10 may determine identification information of tagged items 11 in an area based on the detector data 12 acquired by the detectors 14. The theft monitoring system 10 may receive location data of the detectors 14 from the detectors 14 or other sources (e.g., storage, or user input). The theft monitoring system 10 may generate an item area map based on the detector data 12 and the location data of the detectors 14. The item area map may include identification information and location information of tagged items 11 within the area. In certain embodiments, a theft incident may be determined by comparing the items on the item area map with tagged items 11 on a list of tagged items 11 in the area. By way of an example, in certain embodiments, a list of tagged items 11 in an area may include a TV, but an item area map generated by the theft monitoring system 10 may indicate that the TV is not currently in the area, which may indicate a theft incident of the TV inside the area. In certain embodiments, the theft monitoring system 10 may store the theft incident information (e.g., time of occurrence, identification information of missing tagged items 11, and so forth) in the storage media 28, the database 36, and so forth.

In certain embodiments, the theft monitoring system 10 may automatically send notifications of the theft incident to certain devices (e.g., the mobile devices 20, vehicle system 44, and so forth). In addition, in certain embodiments, the theft monitoring system 10 may automatically send instructions to activate protective actions, such as activating an alarm system, or deactivating the missing tagged items 11 (e.g., TV block systems in smart TVs may automatically disable all television functions of the smart TVs when stolen). In certain embodiments, the theft monitoring system 10 may determine an insurance policy and/or coverage based on the theft incident information.

In addition, in certain embodiments, the theft monitoring system 10 may detect motion patterns of a particular item 11 based on detector data 12 and compare the detected motion patterns with a recommendation of motion patterns for the particular item 11 determined based on the particular item's functions, properties, circumstances, environment, and so forth. In certain embodiments, the location of the particular item 11 may not change for a period of time (e.g., one week or one month). For instance, a dishwasher installed in a household may not move under normal working conditions, and the theft monitoring system 10 may determine a corresponding recommendation of a motion pattern for the dishwasher. When the motion patterns detected by the theft monitoring system 10 agrees with the recommendation, the theft monitoring system 10 may determine that the tagged item 11 is working under normal condition.

In certain embodiments, the theft monitoring system 10 may automatically send a power saving signal to a tag 16 installed in or disposed on the tagged item 11 to instruct the tag 16 to operate in a power saving mode, such as use a smaller repetition rate to transmit signals (e.g., switching from transmitting signals every hour to every two hours). In certain embodiments, the tag 16 may receive the power saving signal from a detector 14. As such, the tag 16, which may be powered by a button cell, may consume less power and work for a longer period before it needs to change the button cell.

When the motion patterns detected by the theft monitoring system 10 do not agree with the recommendation, the theft monitoring system 10 may determine that the tagged item 11 is not working under normal working conditions. For instance, when the theft monitoring system 10 detects a dishwasher installed in a household moving, the theft monitoring system 10 may determine that the dishwasher is not working under normal working conditions (e.g., the dishwasher is being taken away from the household or there may be an earthquake). In addition, in certain embodiments, the theft monitoring system 10 may utilize machine learning algorithms 34 or other identifying techniques to determine or identify correlations between the motion patterns of a certain item 11 and environment of the area (e.g., earthquake, tornado, flooding, and so forth). The theft monitoring system 10 may automatically send notifications of the abnormal condition to devices. As such, protective actions may be activated in response to the notification, and insurance policy or coverage may be determined and/or adjusted accordingly.

In certain embodiments, the detector data 12 may be uploaded to the databases 36 and/or the cloud storage 40 for the theft monitoring system 10 to analyze using mobile devices 20. In certain embodiments, one or more mobile devices 20 (e.g., smart phone) may be used to store the detector data 12, and then upload the detector data 12 to the databases 36 and/or the cloud storage 40. For example, the detector data 12 may be transmitted from the detectors 14 to one or more mobile devices 20, and then the detector data 12 may be uploaded to the cloud storage 40 by the one or more mobile devices 20. In certain embodiments, the detector data 12 may be uploaded to the databases 36 and/or the cloud storage 40 after the theft incident has occurred. For example, during a network outage, the detector data 12 may be transmitted (e.g., through Bluetooth) and stored on certain mobile devices 20, and then uploaded to the databases 36 and/or the cloud storage 40 sometime later. In certain embodiments, the theft monitoring system 10 may be installed on mobile devices 20, and the detector data 12 may be transmitted to the storage media 28 from the mobile devices 20.

Figure 3:
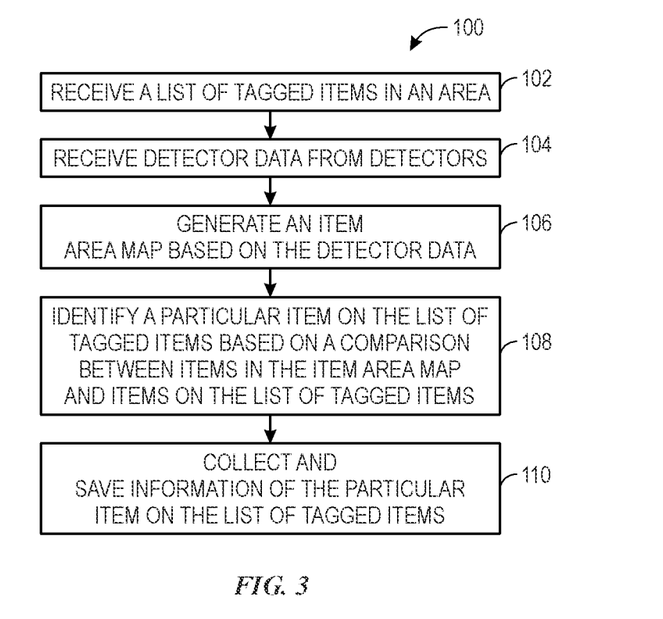
FIG. 3 illustrates a flow chart of a method for detecting a particular item based on data acquired from the data sources of FIG. 1, in accordance with embodiments described herein.

FIG. 3 illustrates a method 100 for detecting a theft incident based on data acquired from the data sources described in greater detail herein. The theft monitoring system 10 may perform operations described in greater detail herein via the processor 24 based on processor-executable code stored in the memory media 26 and/or the storage media 28. The processor 24 may execute the processor-executable code to receive the detector data 12 and conduct analysis as described in greater detail herein. In certain embodiments, based on the monitoring and analysis, the theft monitoring system 10 may automatically send notifications or recommendations, activate protective actions, determine an insurance policy and/or coverage for a user, and so forth. Although the example method described in FIG. 3 is described in a particular order, it should be noted that the example method may be performed in any suitable order and is not limited to the order presented herein. It should also be noted that although each processing block is described below in the example method as being performed by the theft monitoring system 10, other suitable theft monitoring systems may perform the methods described herein.

Referring now to FIG. 3, at block 102, the theft monitoring system 10 may receive a list of tagged items 11 in an area (e.g., property 18) from the mobile devices 20, the storage media 28, the database 36, the network 38, the cloud storage 40, or other sources (e.g., user input). For example, in certain embodiments, the theft monitoring system 10 may collect the list of tagged items 11 in an area from the user, such as from the user's insurance application. In certain embodiments, the theft monitoring system 10 may present a visualization that requests the user or some other individual to provide location information for certain items 11. In certain embodiments, the list of tagged items 11 in the area may be determined at the initial setup of tags 16 for the area, or the list may be updated at some later time.

At block 104, the theft monitoring system 10 may use the communication component 22 to receive detector data 12 generated by the detectors 14. In certain embodiments, the detectors 14 may automatically send out a detecting signal and scan the area to detect reflected or scattered detecting signals from the tags 16 (e.g., RADAR, LIDAR, RFID reader, IR depth camera, and so forth). The reflected or scattered detecting signals may include information that may be used by the theft monitoring system 10 to determine identification information and location information of the tagged items 11. Each tag 16 may be integrated in or disposed on a particular item 11 located inside the area. In certain embodiments, the tags 16 may emit signals comprising identification information of tagged items 11 or information that may be used by the theft monitoring system 10 to determine identification information of the tagged items 11, and the detectors 14 may detect the signals and determine the location of the tags 16. In certain embodiments, the detectors 14 may record a time stamp for the detected signals. In certain embodiments, in order to identify the particular tag 16, signals from a particular tag 16 may be emitted at a predetermined repetition rate (e.g., every 1 hour, every 30 minutes, every 15 minutes, every 5 minutes, and so forth), may use a predetermined transmission frequency (e.g., 144 MHZ), may be modulated by frequency modulation (FM) or amplitude modulation (AM), and/or may be coded by other methods (e.g., digitally coded). In certain embodiments, the reflected or scattered detecting signals from tags 16 may be used to recognize the identification of the associated tagged items 11. For instance, a reflected or scattered detecting signal of an IR depth camera from tags 16 may be used to determine the identification and the location of the associated tagged items 11. In certain embodiments, the theft monitoring system 10 may utilize machine learning algorithms 34 or other identifying techniques to determine or identify a certain item 11 based on the reflected or scattered detecting signal. As such, the theft monitoring system 10 may determine identification information, location information, and detected time of the tagged items 11 in the area (e.g., property 18) based on the detector data 12.

After receiving detector data 12 generated by the detectors 14, at block 106, the theft monitoring system 10 may generate an item area map for the tagged items 11 in the area based on the received detector data 12. The item area map may comprise identification information and location information of the tagged items 11 in the area, and/or detected time of the tagged items 11. The theft monitoring system 10 may use the detector data 12 to determine the identification information, the location information, and the detected time of the tagged items 11.

In certain embodiments, the theft monitoring system 10 may use network traffic data received from network devices (e.g., routers) to generate an item area map (i.e., item network identification associated with virtual network address) for tagged items 11 using the network connections in the area. For example, in certain embodiments, network traffic data packets received by the theft monitoring system 10 may include a MAC address, such that a first portion of the MAC address may indicate that a particular vendor (e.g., manufacturer) is associated with the particular item 11 (and/or associated tag 16) and a second portion of the MAC address may indicate that the particular item 11 (and/or associated tag 16) corresponds to a particular type of device (e.g., tablet). As such, the MAC address may indicate to the theft monitoring system 10 the particular type of tagged item 11 (and/or associated tag 16) being detected.

At block 108, the theft monitoring system 10 may identify a particular item 11 on the list of tagged items 11 missing in the area based on a comparison between the tagged items 11 on the generated item area map and tagged items 11 on the received list of tagged items 11 in the area. The theft monitoring system 10 may compare the tagged items 11 on the received list of tagged items 11 in the area with the tagged items 11 on the item area map for the area to determine whether a tagged item 11 on the list of tagged items 11 is missing. After making the comparison, in certain situations, the theft monitoring system 10 may determine that some of the detector data 12 is not related to the identifying of the particular item 11 in the area and, thus, refrain from evaluating the respective portion of the detector data 12 for future analysis.

After identifying the particular item 11, at block 110, the theft monitoring system 10 may collect information of the particular item 11, such as identification information, location information, detected time, and so forth. In certain embodiments, the theft monitoring system 10 may store the collected information in storage, such as in the storage media 28, the database 36, and so forth. The theft monitoring system 10 may continuously monitoring the tagged items 11 inside the area and update the information of the missing tagged items 11. For instance, a particular item 11 may be returned to the area after a certain time period, and the theft monitoring system 10 may update the information of the particular item 11 in the storage.

Figure 4:
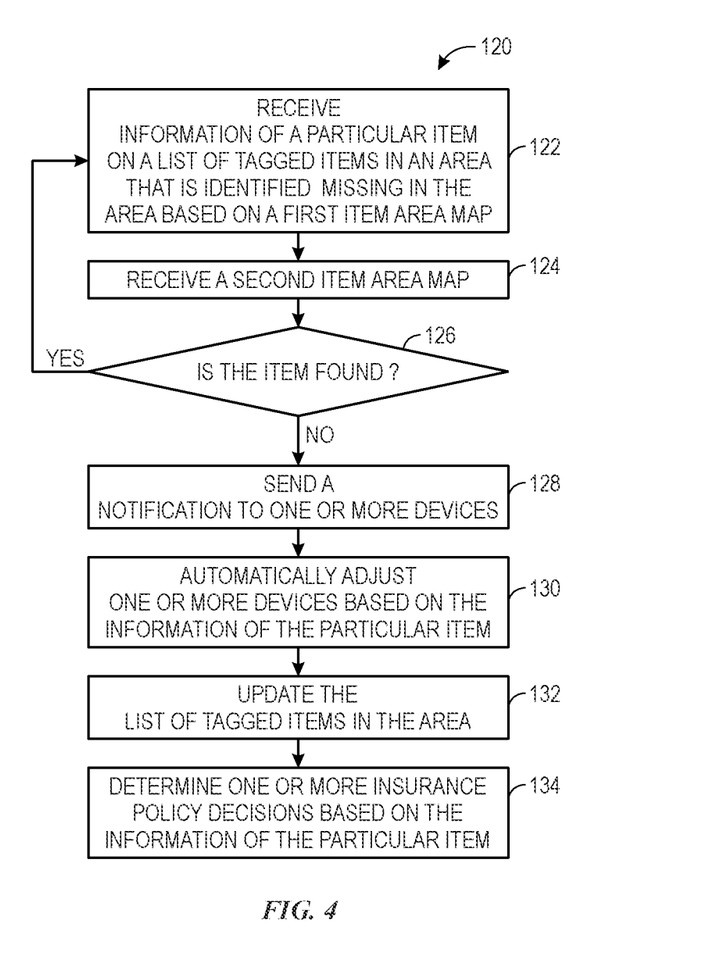
FIG. 4 illustrates a flow chart of a method for confirming a particular item is stolen based on data acquired from the data sources of FIG. 1, in accordance with embodiments described herein.

FIG. 4 illustrates a method 120 for confirming a theft incident of a particular item 11 identified missing above in FIG. 3. The theft monitoring system 10 may confirm the theft incident of the particular item 11 by searching for it in other item area maps, such as item area maps generated for different areas (e.g., other rooms, other buildings, vehicles, and so forth) or item area maps generated based on data from different sources (e.g., network devices, network service providers, GPS, and so forth). The theft monitoring system 10 may perform operations described herein via the processor 24 based on processor-executable code stored in the memory media 26 and/or the storage media 28. The processor 24 may execute the processor-executable code to receive the detector data 12 and conduct analysis as described in greater detail herein. Based on the monitoring and analysis, the theft monitoring system 10 may automatically adjust devices based on the information of the particular item 11, update the list of tagged items 11 in the area, determine one or more insurance policy decisions based on the information of the particular item 11, and so forth.

Although the example method in FIG. 4 is described in a particular order, it should be noted that the example method may be performed in any suitable order and is not limited to the order presented herein. It should also be noted that although each processing block is described below in the example method as being performed by the theft monitoring system 10, other suitable theft monitoring systems may perform the methods described herein.

Referring now to FIG. 4, at block 122, the theft monitoring system 10 may receive information of a particular item 11 on a list of tagged items 11 in an area, wherein the particular item 11 is identified missing in the area by the theft monitoring system 10 using a first item area map for the area. The theft monitoring system 10 may receive the information of the particular item 11 from mobile devices 20, the storage media 28, the database 36, the network 38, the cloud storage 40, the vehicle system 44, or other sources (e.g., user input). In certain embodiments, the theft monitoring system 10 may receive information of the particular item 11 from a user, such as from the user's insurance claim. In certain embodiments, the theft monitoring system 10 may present a visualization that requests the user or some other individual to provide information for the particular item 11.

At block 124, the theft monitoring system 10 may receive a second item area map that may be generated based on data from sources other than the sources used to generate the first item area map, such as detector data 12 from other areas (e.g., other room, other building) or data from other sources (e.g., network devices, network service providers, GPS, and so forth), and the second item area map may be generated for the same area as the first item area map or for a different area. For instance, in certain embodiments, the first item area map may be generated for the property 18 using the detector data 12 received from detectors 14 inside the property 18, and the second item area map may be generated for an area other than the property 18 using detector data 12 received from detectors 14 outside of the property 18, such as detectors 14 in other rooms or other buildings, detectors 14 in mobile devices 20 outside of the property 18 (e.g., smart phone or smart watch travelling with the user), or detectors 14 in vehicles 42 outside of the property 18. In other embodiments, the second item area map may also be generated for the property 18 using data from other sources (e.g., GPS data). In addition, in certain embodiments, the second item area map may be generated for a network in the property 18 using data received from network devices. For instance, a smart device identified missing from the property 18 may be found in a network to which it is communicatively connected.

At block 126, the theft monitoring system 10 may search the information of the particular item 11 in the second item area map. For example, if the particular item identified missing in the property 18 is found on the second item area map generated by detector data received from a detector 14 in a mobile device 20 travelling with an owner of the property 18, a theft incident may not have occurred (i.e., the owner may have taken the tagged item 11 from the property 18). The owner may take the particular item 11 with him, put it in a vehicle 42 or in other locations (e.g., other buildings, and so forth). The theft monitoring system 10 may receive detector data 12 for other areas directly, or through mobile devices 20, the network 38, the cloud storage 40, or from the vehicle system 44. For instance, jewelry, cloths, shoes, accessories, or other wearable tagged items 11 may be tagged and tracked by the theft monitoring system 10 in the owner's property 18. The owner may wear those tagged items 11 outside of property 18, and the theft monitoring system 10 may track these tagged items 11 by using detector data 12 from other areas. For instance, if the particular item 11 is determined to be stolen or lost outside of the property 18, rather than inside the property 18, the insurance for the property 18 may not cover the particular item 11. As such, the theft monitoring system 10 may help both an insurance company and the user to avoid false alarms and/or false insurance claims, or determine insurance claims more precisely.

At block 128, the theft monitoring system 10 may automatically send notifications to devices after the theft monitoring system 10 determines that the particular item 11 is not found and that a theft incident may have occurred. For example, the theft monitoring system 10 may automatically send the notifications to a mobile device 20 or any other suitable device associated with the user. The notifications may cause the mobile device 20 to automatically launch or execute an application to provide a visual, audible, or haptic notification to the user. In this way, the user may be notified in substantially real time with respect to the detected theft incident.

At block 130, the theft monitoring system 10 may send instructions to automatically adjust devices based on the identification information of the particular item 11. In addition, in certain embodiments, the theft monitoring system 10 may send instructions to automatically activate protective actions, such as activating an alarm system, or deactivating the particular item 11 (e.g., TV block systems in smart TVs may automatically disable all television functions of the smart TVs when stolen). In addition, in certain embodiments, the theft monitoring system 10 may send instructions to automatically adjust operations of certain devices that are related to the aftermath of the theft incident. For instance, the theft monitoring system 10 may send instructions to an automatic floor cleaning device to cancel or reschedule a routine cleaning in an area when the theft monitoring system 10 determines a theft incident has occurred in the area, so that evidence of the theft incident may not be destroyed by the floor cleaning device. As such, the theft monitoring system may aid investigations of the theft incident (e.g., by police or an insurance company).

At block 132, the theft monitoring system 10 may update the list of tagged items 11 in the area by using the information of the missing tagged item 11. In certain embodiments, the theft monitoring system 10 may store the updated list of tagged items 11 in the area in storage, such as in the storage media 28, the database 36, the cloud storage 40, and so forth. The theft monitoring system 10 may continuously update the list of tagged items 11 in the area.

At block 134, the theft monitoring system 10 may determine one or more insurance policy decisions based on the information of the particular item 11. In certain embodiments, the theft monitoring system 10 may automatically send the determined one or more insurance policy decisions to the user's devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. A system, comprising:
one or more detectors configured to generate detector data based on signals received from one or more tags integrated in or disposed on one or more items; and a theft monitoring system comprising a processor configured to:
receive a first portion of the detector data generated for a first location associated with a user from the one or more detectors;
determine a first set of identification information corresponding to a first item of the one or more items based at least in part on the first portion of the detector data;
receive a list of tagged items for the first location, wherein the list of tagged items comprises a second set of identification information corresponding to the one or more items;
in response to determining that the first item is missing from the first location based on a first comparison of the first set of identification information and the second set of identification information, receive a second portion of the detector data for a second location associated with the user from the one or more detectors, wherein the second location comprises a vehicle associated with the user;
determine a third set of identification information corresponding to the first item based at least in part on the second portion of the detector data;
in response to determining that the first item is missing from the second location based on a second comparison of the third set of identification information and the second set of identification information, identify a theft incident for the first item on the list of tagged items;
automatically control operating parameters of one or more cleaning devices associated with the first location or the second location in response to identifying the theft incident, wherein automatically controlling the operating parameters of the one or more cleaning devices comprises canceling or rescheduling routine cleaning operations to be performed by the one or more cleaning devices in one or more areas associated with the first location or the second location; and
determine one or more insurance policy decisions for the first item based on the theft incident.

2. The system of claim 1, wherein at least one of the one or more detectors is located in the first location.

3. The system of claim 1, wherein at least one detector of the one or more detectors is located in the second location different from the first location.

4. The system of claim 1, wherein at least one detector of the one or more detectors is on a mobile device located in the second location different from the first location.

5. The system of claim 1, wherein the one or more tags comprise a motion sensor, a RFID sensor, a location sensor, a sound sensor, an image sensor, a temperature sensor, an intelligent electronic device, a beacon, or some combination thereof.

6. The system of claim 1, wherein the one or more detectors comprise a motion detector, an RFID reader, a beacon detector, a sound detector, a RADAR, a LIDAR, an IR depth camera, or some combination thereof.

7. The system of claim 1, wherein the processor is configured to:
receive network data comprising a fourth set of identification information corresponding to the first item from one or more network devices associated with a communication network;
identify the first item in the communication network based on a comparison of the first set of identification information and the fourth set of identification information; and
automatically send a notification indicating the first item in the communication network to one or more electronic devices.

8. The system of claim 7, wherein the processor is configured to automatically adjust the operating parameters of the one or more cleaning devices in response to identifying the first item in the communication network.

9. A method comprising:
receiving a first portion of detector data from one or more detectors configured to receive signals from one or more tags integrated in or disposed on one or more items, wherein the first portion of the detector data is generated for a first location associated with a user;
determining a first set of identification information corresponding to a first item of the one or more items based at least in part on the first portion of the detector data;
receiving a list of tagged items for the first location, wherein the list of tagged items comprises a second set of identification information corresponding to the one or more items;
in response to determining that the first item is missing from the first location based on a first comparison of the first set of identification information and the second set of identification information, receiving a second portion of the detector data for a second location associated with the user from the one or more detectors, wherein the second location comprises a vehicle associated with the user;
determining a third set of identification information corresponding to the first item based at least in part on the second portion of the detector data;
in response to determining that the first item is missing from the second location based on a second comparison of the third set of identification information and the second set of identification information, identifying a theft incident for the first item on the list of tagged items;
automatically controlling operating parameters of one or more cleaning devices associated with the first location or the second location in response to identifying the theft incident, wherein automatically controlling the operating parameters of the one or more cleaning devices comprises canceling or rescheduling routine cleaning operations to be performed by the one or more cleaning devices in one or more areas associated with the first location or the second location; and
determining one or more insurance policy decisions for the first item based on the theft incident.

10. The method of claim 9, wherein at least one of the one or more detectors is located in the first location.

11. The method of claim 9, wherein at least one detector of the one or more detectors is located in the second location different from the first location.

12. The method of claim 9, wherein at least one detector of the one or more detectors is on a mobile device located in the second location different from the first location.

13. The method of claim 9, comprising:
receiving network data comprising a fourth set of identification information corresponding to the first item from one or more network devices associated with a communication network;

identifying the first item in the communication network based on a comparison of the first set of identification information and the fourth set of identification information; and automatically sending a notification indicating the first item in the communication network to one or more electronic devices.

14. The method of claim 13, comprising automatically adjusting the operating parameters of the one or more cleaning devices in response to identifying the first item in the communication network.

15. The method of claim 9, wherein the one or more tags comprise a motion sensor, an RFID sensor, a location sensor, a sound sensor, an image sensor, a temperature sensor, an intelligent electronic device, a beacon, or some combination thereof.

* * * * *